(12) United States Patent
Huang et al.

(10) Patent No.: US 11,628,627 B2
(45) Date of Patent: Apr. 18, 2023

(54) ADDITIVE MANUFACTURING PROCESS TO DISGUISE PHYSICAL CHARACTERISTICS OF ITEM

(71) Applicant: Hewlett-Packard Development Company, L.P., Spring, TX (US)

(72) Inventors: Wei Huang, Palo Alto, CA (US); Steven J. Simske, Fort Collins, CO (US); Gary J. Dispoto, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 239 days.

(21) Appl. No.: 16/629,632

(22) PCT Filed: Jul. 18, 2017

(86) PCT No.: PCT/US2017/042540
§ 371 (c)(1),
(2) Date: Jan. 9, 2020

(87) PCT Pub. No.: WO2019/017896
PCT Pub. Date: Jan. 24, 2019

(65) Prior Publication Data
US 2020/0223148 A1    Jul. 16, 2020

(51) Int. Cl.
*B29C 64/40* (2017.01)
*B29C 64/112* (2017.01)
(Continued)

(52) U.S. Cl.
CPC ............ *B29C 64/40* (2017.08); *B29C 64/112* (2017.08); *B33Y 10/00* (2014.12); *B33Y 30/00* (2014.12); *B33Y 70/00* (2014.12); *B33Y 50/02* (2014.12)

(58) Field of Classification Search
CPC ...... B29C 64/182; B29C 64/40; B29C 64/112; B29C 64/165; B33Y 10/00; B33Y 30/00; B33Y 70/00
See application file for complete search history.

(56) References Cited

U.S. PATENT DOCUMENTS 6,280,771 B1 * 8/2001 Monkhouse ............. A61K 9/14
424/484
8,915,583 B2   12/2014 Edwards et al.
(Continued)

FOREIGN PATENT DOCUMENTS

EP         3145721        3/2017
WO    WO-2015145346       1/2015
(Continued)

OTHER PUBLICATIONS

Upcraft, Steve et al. "The Rapid Prototyping Technologies", Assembly Automation 23, No. 4 (2003): 318-330.

*Primary Examiner* — Yunju Kim
(74) *Attorney, Agent, or Firm* — Shook, Hardy & Bacon L.L.P.

(57) ABSTRACT

In an example, a method is described that includes generating a model for fabricating an item via an additive manufacturing process. The model includes a first region defining the item and a second region defining a sacrificial artifact whose presence disguises a physical characteristic of the item. The item and the sacrificial artifact are then fabricated in a common build batch via the additive manufacturing process.

12 Claims, 5 Drawing Sheets

(51) Int. Cl.
*B33Y 10/00* (2015.01)
*B33Y 30/00* (2015.01)
*B33Y 70/00* (2020.01)
*B33Y 50/02* (2015.01)

(56) References Cited

U.S. PATENT DOCUMENTS

| | | | |
|---|---|---|---|
| 9,815,118 B1* | 11/2017 | Schmitt | B22F 3/1021 |
| 2003/0133822 A1* | 7/2003 | Harryson | B22F 7/02 |
| | | | 419/35 |
| 2015/0158244 A1 | 6/2015 | Tibbs et al. | |
| 2015/0314530 A1* | 11/2015 | Rogren | B33Y 30/00 |
| | | | 264/131 |
| 2016/0288413 A1 | 10/2016 | Yakubov et al. | |

FOREIGN PATENT DOCUMENTS

| | | |
|---|---|---|
| WO | WO-2015022572 | 2/2015 |
| WO | WO-2016010590 | 1/2016 |

* cited by examiner

ADDITIVE MANUFACTURING PROCESS TO DISGUISE PHYSICAL CHARACTERISTICS OF ITEM

BACKGROUND

Additive manufacturing processes (also referred to as "three-dimensional printing" processes) are often used to fabricate objects including three-dimensional objects. In an additive manufacturing process, a computer controls the spreading of powder and jetting of printing fluid to form successive layers of material according to a digital model of an object. The printing fluid may contain a fusing agent that causes the powder to fuse under certain conditions, such as exposure to energy. Thus, as the successive layers fuse to each other, a three-dimensional object is formed. Such processes may be used to fabricate a variety of three-dimensional objects, including functional and aesthetic machine components, consumer and industrial products that are produced in short runs (e.g., less than one thousand units), and customized high-value-products that may be one-of-a-kind.

DETAILED DESCRIPTION

Figure 1:
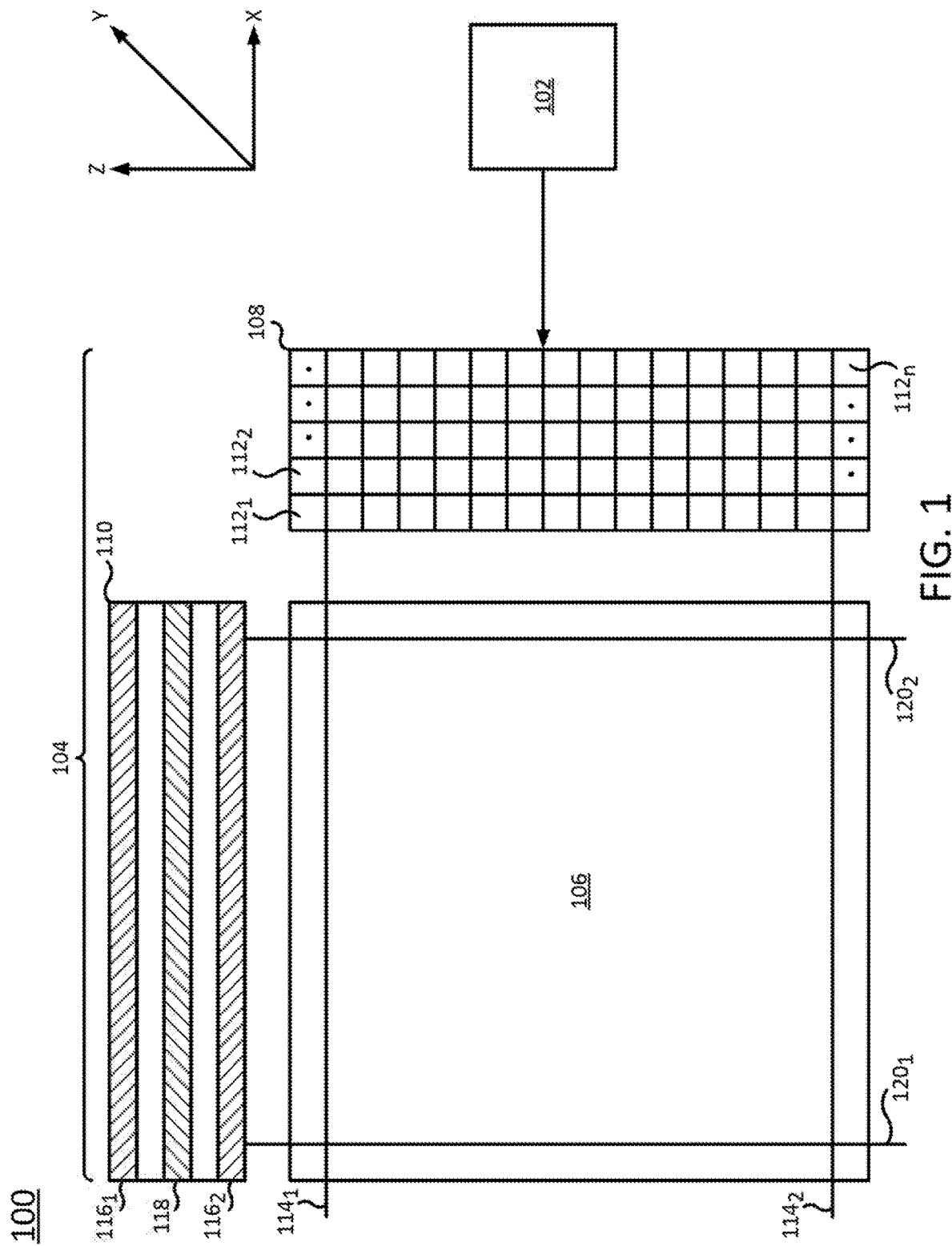
FIG. 1 illustrates a block diagram of a top view of an example system of the present disclosure.

The present disclosure broadly describes an apparatus, method, and non-transitory computer-readable medium for additive manufacturing that disguises a physical characteristic of an item being manufactured. As discussed above, additive manufacturing processes may be used to fabricate a variety of objects (e.g., three-dimensional, two-dimensional, and 2.5 dimensional objects including surface finishings or coatings), including functional and aesthetic machine components, consumer and industrial products that are produced in short runs (e.g., less than one thousand units), and customized high-value products that may be one-of-a-kind. The design information (e.g., geometry, color, etc.) for some of these items may be considered proprietary. For instance, intellectual property, personal information, or even sensitive military data can be extracted in some cases simply from the design information, which may be exposed during the manufacturing process due to the configuration of the manufacturing hardware (e.g., as in the case where the build bed of the additive manufacturing system is open for viewing). Thus, an unauthorized individual may be able to deduce the engineering steps, or "reverse engineer" all or part of an object by recording the manufacturing process, or even just by capturing an image of the object during manufacturing.

Examples of the present disclosure disguise a physical characteristic of an item fabricated using an additive manufacturing process by fabricating a sacrificial artifact with the item in a common build batch. A model (e.g., a slice image) is generated that includes the item to be fabricated, as well as at least one sacrificial artifact. The item and the sacrificial artifact are subsequently fabricated, possibly using printing fluids of differing qualities. To an observer with no knowledge of the model generation process, it is unclear which fabricated product is the item and which is the sacrificial artifact. Thus, physical characteristics of the item (such as quantity, color, size, or the like) can be disguised by the presence of the sacrificial artifact. For instance, the sacrificial artifact may appear visually identical to the item but be fabricated using a less expensive printing fluid, in order to disguise the number of items being manufactured (e.g., as in the number of pills being produced to fill a patient's prescription). In another case, the sacrificial artifact may be a different size and/or color than the item, in order to disguise the size and/or color of the item being fabricated (e.g., as in the case of a high-value machine part). The presence of the sacrificial artifact(s) obscures the exact shape and dimensions of the item to be fabricated during the manufacturing process, but does not fuse or bind to the item upon completion of the manufacturing process. Thus, the fabrication of the sacrificial artifact(s) does not interfere with fabrication of the item or alter the final fabricated item. Moreover, because the item and the sacrificial artifact(s) are printed at the same time, the manufacturing time is not extended, and additional manufacturing cost is therefore minimized (particularly when the materials used to fabricate the sacrificial artifact(s) can be recycled).

Within the context of the present disclosure, the term "sacrificial" is meant to indicate an artifact that is fabricated with the item being fabricated in a common build batch, but is not physically part of the final item. Despite the description of this artifact as sacrificial, the materials used to fabricate the artifact may be recyclable and/or reusable in subsequent additive manufacturing processes.

Examples of the present disclosure can also be extended in all three dimensions. For instance, although examples of the present disclosure describe an additive manufacturing process based on slice images that are reconstructed in the x and z dimensions of the three-dimensional coordinate plane, entire disguised images can also be fabricated along the y axis (i.e., in the build direction). That is, the physical characteristics of the item being fabricated can also be disguised in the y dimension by generating sacrificial artifacts.

Although examples of the disclosure are described within the context of an inkjet-style additive manufacturing system, the described examples may be equally applicable to other types of additive manufacturing systems, including systems based on three-dimensional binder jetting. Thus, any references to "fusing" printing fluids or agents could be applicable to "binding" printing fluids or agents as well, and any references to "non-fusing" printing fluids or agents could also be applicable to "non-binding" printing fluids or agents.

FIG. 1 illustrates a block diagram of a top view of an example system 100 of the present disclosure. In one example, the system 100 is a fluid ejection system, such as an additive manufacturing system using inkjet technology. The system 100 generally includes an image processing system 102 and a print engine 104. The image processing system 102 and print engine 104 work together to fabricate a three-dimensional item via selective addition of a material, such as a fusing agent.

In one example, the image processing system 102 comprises a computing device (e.g., a general purpose computing device or a special purpose computing device) that stores a model of an item to be fabricated. In one example, the item is fabricated by the print engine 104 in a series of layers that are fused together. Thus, the model of the item may comprise a plurality of cross sections or slice images that are reproduced by the print engine 104 in printing fluid, where each slice image corresponds to one or more of the layers of the item. The image processing system may or may not include an application for generating and/or modifying the model.

The image processing system 102 sends electronic signals to the print engine 104. These electronic signals, in turn, drive the components of the print engine 104 (discussed in further detail below) to cooperate to fabricate the item. Although the image processing system 102 is illustrated as being external or separate from the print engine 104, some image processing system functions may be performed by the image processing system 102. Thus, the system illustrated in FIG. 1 shows one example configuration that may be used to implement the functionality of the image processing system 102 and the print engine 104.

In one example, the print engine 104 comprises a build bed 106, a movable fluid ejection array 108, and a moveable curing array 110. The build bed comprises a working area upon which the item is fabricated, and may comprise a substantially flat, planar space.

The moveable fluid ejection array 108 includes a plurality of fluid ejection modules $112_1$-$112_n$ (hereinafter collectively referred to as "fluid ejection modules 112"), each of which may be controlled by a respective fluid ejection module controller (not shown) that receives electronic signals from the image processing system 102. Each fluid ejection module 112 may include a plurality of fluid ejection devices (e.g., dies, pens, nozzles, or the like) for ejecting printing fluid (e.g., fusing agents, non-fusing agents, detailing agents). The fluid ejection devices may be of the type used in high-speed commercial inkjet printing presses. In one example, at first plurality of the fluid ejection devices ejects a first printing fluid, while a second plurality of the fluid ejection devices ejects a second printing fluid that differs from the first printing fluid with respect to some quality. For instance, in one example, the first printing fluid may contain a fusing agent that causes a powder to fuse together or solidify when exposed to a quantity of energy (i.e., a "fusing" printing fluid), while the second printing fluid may contain non-fusing agents that prevent the powder from fully fusing together or solidifying when exposed to the quantity of energy (i.e., "non-fusing" printing fluids). In another example, the first printing fluid may be more costly than the second printing fluid. In yet another example, the first printing fluid and the second printing fluid may be different colors. In further examples, the first and second printing fluids may contains different ingredients; for instance, the first printing fluid may contain active pharmaceutical ingredients that the second printing fluid does not contain. In further examples still, the first print fluid and the second printing fluid may contain two or more reagents that react together strongly when combined (e.g., two or more reactants in a composition reaction).

A third plurality of the fluid ejection devices may eject a detailing agent. However, in some examples, the second printing fluid may additionally serve as a detailing agent.

In one example, the moveable fluid ejection array 108 is moveable in at least two dimensions (or, along two axes of a three-dimensional coordinate plane). In the example illustrated in FIG. 1, the moveable fluid ejection array 108 is moveable along the x dimension (e.g., from left to right across the page of FIG. 1, or along the dimension parallel to the plane of the build bed 106) and along the y dimension (e.g., into the page of FIG. 1, or along the dimension perpendicular to the plane of the build bed 106). In this case, a first set of tracks $114_1$ and $114_2$ supports the moveable fluid ejection array 108 for movement along the x dimension, while a second set of tracks (not shown) supports the moveable fluid ejection array 108 for movement along the y dimension.

The moveable curing array 110 includes at least one emitter $116_1$-$116_n$ (hereinafter collectively referred to as "emitters 116") for emitting energy (e.g., heat, light, acoustic energy, etc.), and a material coater 118 (e.g., a blade or roller) for dispensing and spreading a coating material. The emitter(s) 116 and material coater 118 may be arranged as alternating modules on the surface of the moveable curing array 110.

The moveable curing array 110 is moveable in at least two dimensions (or, along two axes of a three-dimensional coordinate plane). In the example illustrated in FIG. 1, the moveable curing array 110 is moveable along the z dimension (e.g., from top to bottom across the page of FIG. 1, or along the dimension parallel to the plane of the build bed 106 and perpendicular to the dimension along which the moveable fluid ejection array 108 moves) and along the y dimension (e.g., into the page of FIG. 1, or along the dimension perpendicular to the plane of the build bed 106). In this case, a first set of tracks $120_1$ and $120_2$ supports the moveable curing array 110 for movement along the z dimension, while a second set of tracks (not shown) supports the moveable curing array 110 for movement along the y dimension.

In operation, a thin base layer of material (e.g., powder) is coated on the build bed 106 by the moveable curing array 110 (e.g., by the material coater 118) moving in a first direction along the z dimension. Next, the moveable fluid ejection array 108 is moved to the appropriate height (e.g., according to the item model) along the y dimension, and then passes across the build bed 106 in a first direction along the x dimension. As the moveable fluid ejection array 108 passes across the build bed, it lays down a first layer of printing fluid over at least a portion of the powder. The first layer of printing fluid may comprise both the first printing fluid and the second printing fluid, as well as detailing agents, according to a first slice image. The moveable curing array 110 is then moved to the appropriate height (e.g., according to the item model) along the y dimension, and then passes across the build bed 106 in a second direction (e.g., opposite the first direction) along the z dimension. As the moveable curing array 110 passes across the build bed, it may emit energy (e.g., assuming an endothermic or Gibbs Free Energy increasing product; however, if successive layers of the item contribute two or more reactants in an exothermic or less than zero Gibbs Free Energy reaction, then the moveable curing array 110 may not emit energy). Application of the energy to the first layer of printing fluid causes at least some of the printing fluids in the first layer of printing fluid to absorb the energy, which in turn causes at least some of the powder to fuse or solidify into a first layer of the item and/or a first layer of one or more sacrificial artifacts.

The moveable fluid ejection array 108 and the moveable curing array 110 may make subsequent passes, alternating as in the first pass, and reversing direction each time along the x and z dimensions, respectively. Each pass may also move the height of the moveable fluid ejection array 108 and the moveable curing array 110 higher along the y dimension. These subsequent passes fabricate additional layer of the item and/or sacrificial artifact(s), which may fuse to the prior layers, until the item and/or sacrificial artifact(s) are fully fabricated.

As discussed above, the system 100 illustrates one example of an additive manufacturing system that uses inkjet technology. Other additive manufacturing systems may use different types of technology that include additional components, or omit some of the components illustrated in FIG. 1. For instance, an additive manufacturing system that uses three-dimensional binder jetting technology may not include any emitters for emitting energy. However, such a system could still use a combination of binding and non-binding printing fluids to disguise an item during fabrication.

Figure 2:
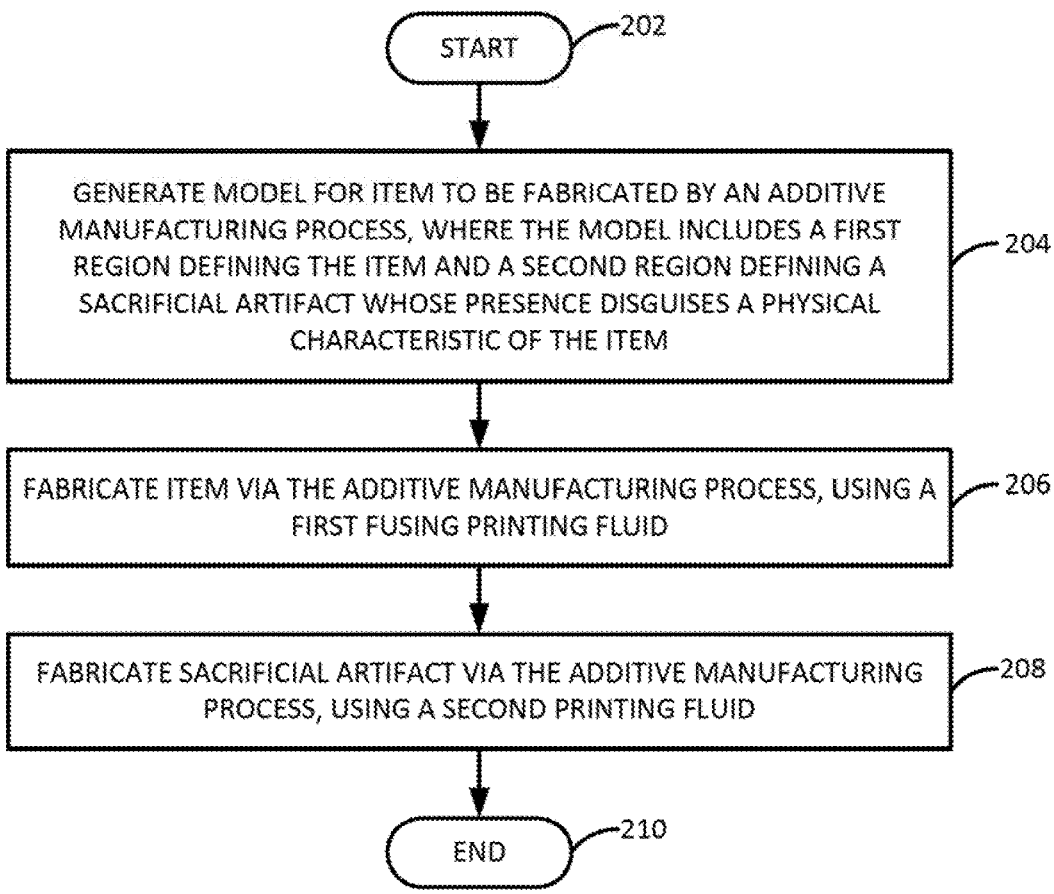
FIG. 2 illustrates a flowchart of an example method for fabricating an item via an additive manufacturing process.

FIG. 2 illustrates a flowchart of an example method 200 for fabricating an item via an additive manufacturing process. The method 200 may be performed, for example, by the system 100 illustrated in FIG. 1. As such, reference is made in the discussion of FIG. 2 to various components of the system 100 to facilitate understanding. However, the method 200 is not limited to implementation with the system illustrated in FIG. 1.

The method 200 begins in block 202. In block 204, a model is generated (e.g., using the image processing system 102) for an item to be fabricated via an additive manufacturing process. As discussed above, the model may comprise a plurality of slice images, where each slice image corresponds to one layer of the item to be fabricated. Thus, each slice image may represent a cross section of the item. In one example, at least one of the slice images includes a first region and a second region. The first region of the slice image defines a cross section of the item to be fabricated, while the second region of the slice image defines a cross section of a sacrificial artifact. The sacrificial artifact is designed so that its presence during fabrication of the item disguises one or more physical characteristics (e.g., size, quantity, color, etc.) of the item.

Figure 3A:
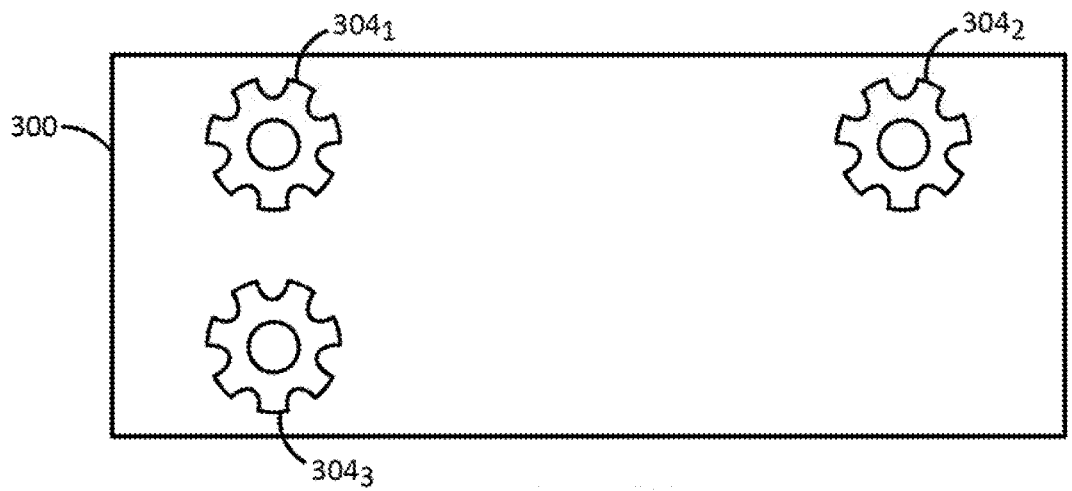
FIG. 3A illustrates a first example slice image of an item to be fabricated via an additive manufacturing process.
Figure 3B:
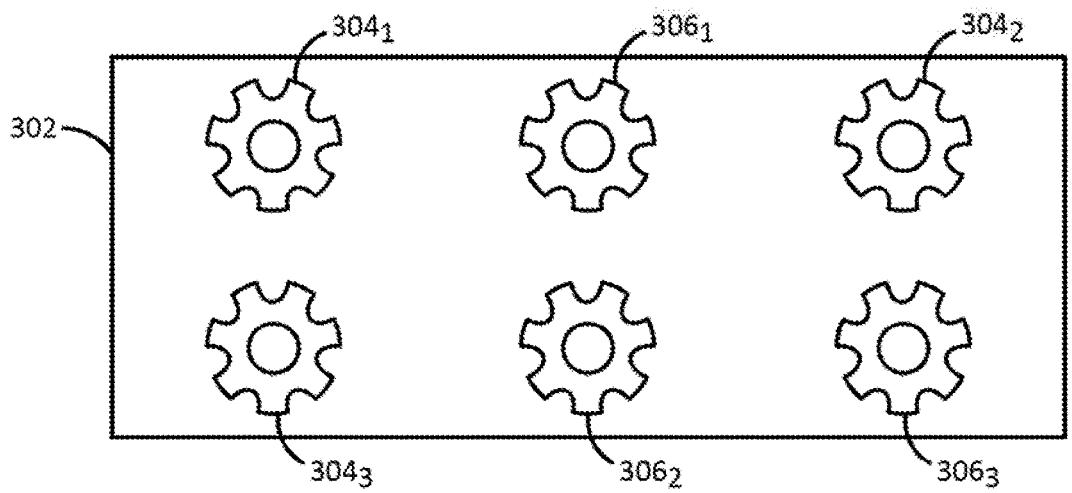
FIG. 3B illustrates a second example slice image of the items of FIG. 3A.

FIG. 3A, for instance, illustrates a first example slice image 300 of an item to be fabricated via an additive manufacturing process. In the example of FIG. 3A, the slice image 300 comprises a slice or cross section of a model of three gears $304_1$-$304_3$ (hereinafter collectively referred to as "gears 304"). FIG. 3B illustrates a second example slice image 302 of the items of FIG. 3A. In the example of 3B, the number of items being fabricated (i.e., the three gears 304 of FIG. 3A) is obscured or disguised by the presence of sacrificial artifacts resembling the items (i.e., gears $306_1$-$306_3$, hereinafter collectively referred to as "gears 306"). In one example, the sacrificial artifacts do not physically contact the items being fabricated; however, in other examples, the sacrificial artifacts may physically contact the items, but be fabricated using non-fusing printing fluid(s). Thus, although it might appear to an observer that six gears are being simultaneously fabricated (i.e., the three gears 304 plus the three gears 306), in reality three of those gears (i.e., gears 306) are sacrificial artifacts.

Figure 3C:
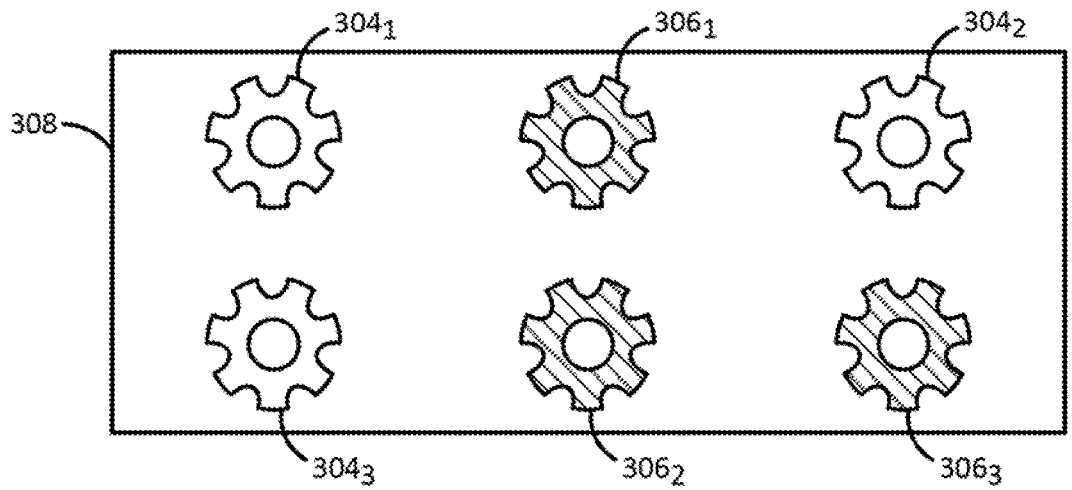
FIG. 3C illustrates an example ink distribution map or model corresponding to the example slice image of FIG. 3B.

FIG. 3C illustrates an example ink distribution map or model 308 corresponding to the example slice image 302 of FIG. 3B. As better seen in FIG. 3C, the example slice image 302 actually comprises at least two regions: a first region that defines the slice of the item(s) to be fabricated (i.e., gears 304) and a second region that defines the slice of the sacrificial artifact(s) (i.e., gears 306).

Although the gears 304 and the gears 306 of the ink distribution map 308 are illustrated in different colors, this does not necessarily indicate that the gears 304 and the gears 306 are printed in different color printing fluids. Rather, it is to show that there is a difference in a physical characteristic between the gears 304 and the gears 306. The gears 304 and the gears 306 could be printed in printing fluids of the same color (i.e., printing fluids that are the same color before and after fusing or binding, though the pre-fusing colors of the printing fluids may differ from the post-fusing colors due to processing). However, the gears 304 are printed or fabricated using a first printing fluid, as discussed above, while the gears 306 are printed or fabricated using a second printing fluid. In one example, the first printing fluid and the second printing fluid differ with respect to some quality (e.g., color, price, ability to fuse, ability to be removed/ablated chemically, thermally, mechanically, or the like, etc.).

Figure 4:
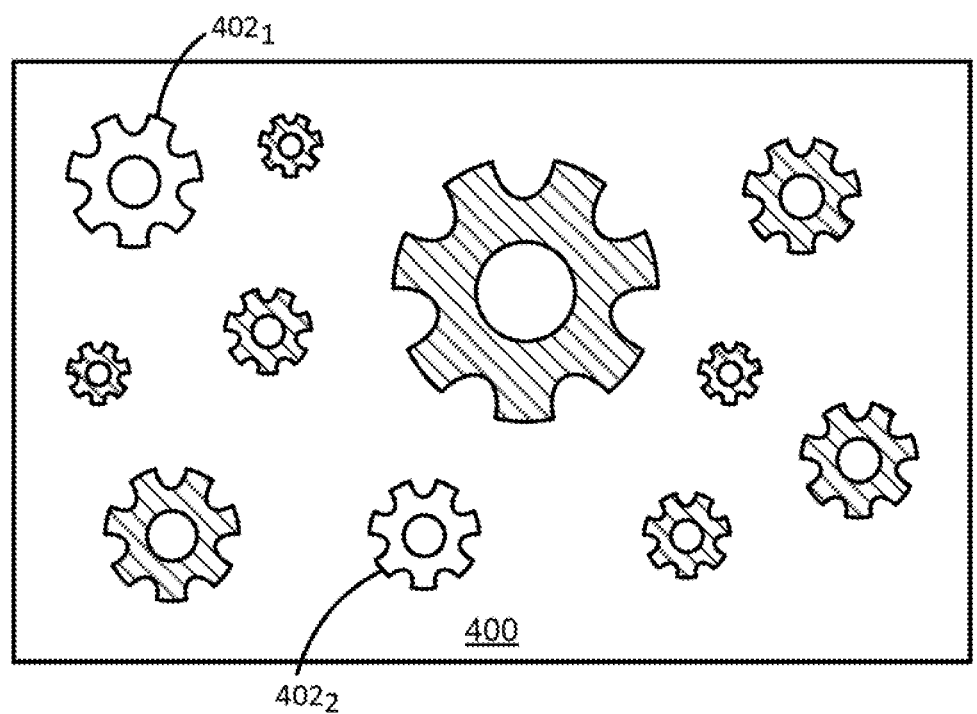
FIG. 4 illustrates a second example ink distribution map.

Examples of the present disclosure could also be used to disguise the size and/or shape of a part being fabricated in a batch. FIG. 4, for instance, illustrates a second example ink distribution map 400. As illustrated, the size and quantity of the items being fabricated (i.e., gears $402_1$ and $402_2$) can be obscured in a slice image corresponding to the ink distribution map 400 by printing one or more sacrificial artifact(s) whose size is different from the size of the items being fabricated. In one example, the sacrificial artifact(s) may be fabricated using a first printing fluid of the same color as a second printing fluid used to fabricate the items; however, some other quality of the first printing fluid may be different from the second printing fluid (e.g., the first printing fluid may be cheaper than the second printing fluid, or the first printing fluid may be non-fusing while the second printing fluid is fusing, etc.).

Referring back to FIG. 2, in block 206, the item is fabricated via the additive manufacturing process, using a first printing fluid to render the item. As discussed above, the first printing fluid is a printing fluid of a first quality (e.g., color, price, ability to fuse, etc.).

In block 208, the sacrificial artifact is fabricated, simultaneously with the item, via the additive manufacturing process. By "simultaneously," it is meant that the sacrificial artifact and the item are fabricated in a common build batch (or common operation of the additive manufacturing system); layers are the sacrificial artifact and the item may or may not be fabricated at precisely the same time. The sacrificial artifact is rendered using a second printing fluid of a second quality. That is, the second printing fluid that differs with respect to some quality from the first printing fluid. For instance, the second printing fluid may be a different color, may be cheaper, or may be non-fusing.

The method 200 ends in block 210.

Thus, if one were to fabricate the gears 304 of FIGS. 3A-3B according to the method 200, the first region of the ink distribution map 302 (including the gears 304) would be fabricated using a first printing fluid, while the second region of the ink distribution map 302 (including the gears 306) would be fabricated using a second printing fluid that differs from the first printing fluid with respect to some quality (e.g., price, color, ability to fuse, ability to be removed/ablated chemically, thermally, mechanically, or the like, etc., as illustrated in FIG. 3B). Other slices or layers of the gears 304 and 306 would be rendered in a similar manner. The result of the additive manufacturing process would thus be the solid, three-dimensional gears 304, plus some number of additional gears 306 that are a different color, comprise cheaper printing fluid, did not fuse, or the like. However, during the fabrication process, an observer would not be able to easily determine which gears were the sacrificial artifacts and which gears were being fabricated for use.

Thus, the method 200 could be used to fabricate a part for a proprietary project. Although the part may be a standard one, the manufacturer may wish to avoid information inference from the part and may therefore choose to fabricate the part according to the method 200. In another example, the method 200 may be used to fabricate medication in pill form, where the number of pills being fabricated may be sensitive. In this case, all of the pills could be printed in the same color, using fusing printing fluids, in a standard pharmaceutical layout. However, the printing fluid used to fabricate the "real" pills may contain an active pharmaceutical ingredient that the printing fluid used to fabricate the "fake" pills may not contain. In one example, the "real" and "fake" pills may be distinguished by means of a non-visual difference, such as density, electromagnetism, compressibility, or some other property that is not readily visible.

It should be noted that although not explicitly specified, some of the blocks, functions, or operations of the methods 200 described above may include storing, displaying and/or outputting for a particular application. In other words, any data, records, fields, and/or intermediate results discussed in the method can be stored, displayed, and/or outputted to another device depending on the particular application. Furthermore, blocks, functions, or operations in FIG. 2 that recite a determining operation, or involve a decision, do not necessarily imply that both branches of the determining operation are practiced.

Further examples of the present disclosure can be extended in the direction of build (e.g., along the y dimension of FIG. 1). In this case, entire sacrificial layers may be fabricated between adjacent non-sacrificial layers of the item in order to disguise the dimensions and physical characteristics of the item in the y dimension.

Figure 5:
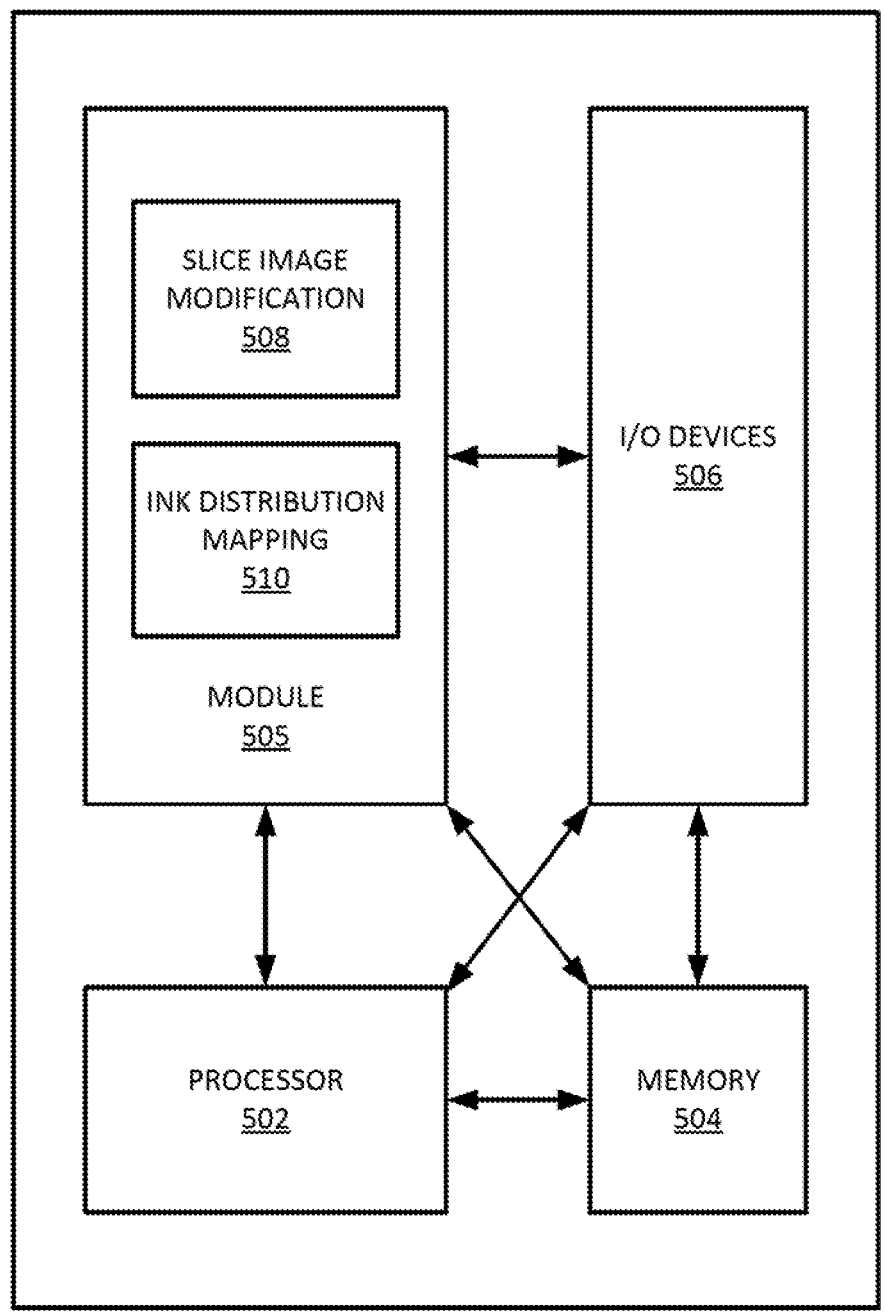
FIG. 5 depicts a high-level block diagram of an example computer that can be transformed into a machine capable of performing the functions described herein.

FIG. 5 depicts a high-level block diagram of an example computer that can be transformed into a machine capable of performing the functions described herein. Notably, no computer or machine currently exists that performs the functions as described herein. As a result, the examples of the present disclosure modify the operation and functioning of the general-purpose computer to perform additive manufacturing using first and second printing fluids of a differing quality, as disclosed herein.

As depicted in FIG. 5, the computer 500 comprises a hardware processor element 502, e.g., a central processing unit (CPU), a microprocessor, or a multi-core processor, a memory 504, e.g., random access memory (RAM) and/or read only memory (ROM), a module 505 for performing additive manufacturing using first and second printing fluids of a differing quality, and various input/output devices 506, e.g., storage devices, including but not limited to, a tape drive, a floppy drive, a hard disk drive or a compact disk drive, a receiver, a transmitter, a speaker, a display, a speech synthesizer, an output port, an input port and a user input device, such as a keyboard, a keypad, a mouse, a microphone, and the like. Although one processor element is shown, it should be noted that the general-purpose computer may employ a plurality of processor elements. Furthermore, although one general-purpose computer is shown in the figure, if the method(s) as discussed above is implemented in a distributed or parallel manner for a particular illustrative example, i.e., the blocks of the above method(s) or the entire method(s) are implemented across multiple or parallel general-purpose computers, then the general-purpose computer of this figure is intended to represent each of those multiple general-purpose computers. Furthermore, a hardware processor can be utilized in supporting a virtualized or shared computing environment. The virtualized computing environment may support a virtual machine representing computers, servers, or other computing devices. In such virtualized virtual machines, hardware components such as hardware processors and computer-readable storage devices may be virtualized or logically represented.

It should be noted that the present disclosure can be implemented by machine readable instructions and/or in a combination of machine readable instructions and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the blocks, functions and/or operations of the above disclosed methods.

In one example, instructions and data for the present module or process 505 for performing additive manufacturing using first and second printing fluids of a differing quality, e.g., machine readable instructions can be loaded into memory 504 and executed by hardware processor element 502 to implement the blocks, functions or operations as discussed above in connection with the method 200. For instance, the module 505 may include a plurality of programming code components, including a slice image modification component 508 and an ink distribution mapping component 510.

The slice image modification component 508 may be configured to modify a slice image or portion of a model for an item to include a sacrificial artifact. For instance, the slice image modification component 508 may be configured to convert an original slice image for an item to a corresponding disguised slice image that includes both the item and a sacrificial artifact, such as the slice image illustrated in FIG. 3A.

The ink distribution mapping component 510 may be configured to generate an ink distribution map for a pass of an additive manufacturing process, based on a slice image that uses both first and second printing fluids of a differing quality. For instance, the ink distribution mapping component 510 may be configured to generate an ink distribution map such as that illustrated in FIG. 3B.

Furthermore, when a hardware processor executes instructions to perform "operations", this could include the hardware processor performing the operations directly and/or facilitating, directing, or cooperating with another hardware device or component, e.g., a co-processor and the like, to perform the operations.

The processor executing the machine readable instructions relating to the above described method(s) can be perceived as a programmed processor or a specialized processor. As such, the present module 505 for performing additive manufacturing using first and second printing fluids of a differing quality, including associated data structures, of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, or variations therein may be subsequently made which are also intended to be encompassed by the following claims.

What is claimed is:

1. A method, comprising:
    generating a model for fabricating an item via an additive manufacturing process, wherein the model includes a first region defining the item and a second region defining a sacrificial artifact that resembles the item, but has a different color than the item, whose presence disguises a physical characteristic of the item;
    fabricating the item via the additive manufacturing process; and
    fabricating the sacrificial artifact and the item in a common build batch, via the additive manufacturing process, wherein the item is fabricated using a fusing printing fluid and the sacrificial artifact that resembles the item is fabricated using a non-fusing printing fluid.

2. The method of claim 1, wherein the fusing printing fluid and the non-fusing printing fluid are different colors.

3. The method of claim 1, wherein the fusing printing fluid contains an active pharmaceutical ingredient not contained in the non-fusing printing fluid.

4. The method of claim 1, wherein the sacrificial artifact resembles the item by having a same shape as the item, and the physical characteristic that is disguised is a color of the item.

5. The method of claim 1, wherein the sacrificial artifact resembles the item by having a same shape as the item, and the physical characteristic that is disguised is a size of the item.

6. The method of claim 1, wherein the sacrificial artifact does not physically contact the item.

7. A non-transitory machine-readable storage medium encoded with instructions executable by a processor, the machine-readable storage medium comprising:
    instructions to generate a model for fabricating an item via an additive manufacturing process, wherein the model includes a first region defining the item and a second region defining a sacrificial artifact that resembles the item, but has a different color than the item, whose presence disguises a physical characteristic of the item;
    instructions to fabricate the item via the additive manufacturing process; and
    instructions to fabricate the sacrificial artifact with the item in a common build batch, via the additive manufacturing process, wherein the item is fabricated using a fusing printing fluid and the sacrificial artifact that resembles the item is fabricated using a non-fusing printing fluid.

8. The non-transitory machine-readable storage medium of claim 7, wherein the fusing printing fluid and the non-fusing printing fluid are different colors.

9. The non-transitory machine-readable storage medium of claim 7, wherein the fusing printing fluid contains an active pharmaceutical ingredient not contained in the non-fusing printing fluid.

10. The non-transitory machine-readable storage medium of claim 7, wherein the sacrificial artifact resembles the item by having a same shape as the item, and the physical characteristic that is disguised is a color of the item.

11. The non-transitory machine-readable storage medium of claim 7, wherein the sacrificial artifact resembles the item by having a same shape as the item, and the physical characteristic that is disguised is a size of the item.

12. The non-transitory machine-readable storage medium of claim 7, wherein the sacrificial artifact does not physically contact the item.

* * * * *